United States Patent [19]

Flotow

[11] Patent Number: 5,263,564
[45] Date of Patent: Nov. 23, 1993

[54] ADJUSTING RING SEAL
[75] Inventor: Richard A. Flotow, Butler, Ind.
[73] Assignee: Dana Corporation, Toledo, Ohio
[21] Appl. No.: 890,070
[22] Filed: May 28, 1992
[51] Int. Cl.⁵ .............................................. F16D 13/75
[52] U.S. Cl. ................... 192/111 B; 192/70.25; 192/111 R; 277/152
[58] Field of Search ............ 192/70.25, 111 B, 111 R, 192/111 A, 113 R, 113 B; 277/237 A, DIG. 4, 84, 152; 403/118

[56] References Cited
U.S. PATENT DOCUMENTS

| | | | |
|---|---|---|---|
| 2,280,355 | 4/1942 | Spase et al. | |
| 2,291,112 | 7/1942 | Slack | 403/118 |
| 2,476,324 | 7/1949 | Reich | 277/152 |
| 2,968,498 | 1/1961 | Saunders | 277/152 X |
| 2,990,220 | 6/1961 | Malone | 277/152 X |
| 3,001,199 | 9/1961 | Imperi | |
| 3,086,631 | 4/1963 | Imperi | |
| 3,250,541 | 5/1966 | McKinven | 277/152 X |
| 4,055,205 | 10/1977 | Withoff et al. | 277/152 X |
| 4,465,285 | 8/1984 | Toyoda et al. | 277/152 X |

Primary Examiner—Rodney H. Bonck
Attorney, Agent, or Firm—Dykema Gossett

[57] ABSTRACT

A clutch adjusting ring defines an operative position for members which are movable to force a drive disc into a driven disc. The adjusting ring is threadably adjustable within the interior of a clutch cover to accommodate wear on the discs. A seal is provided between the clutch cover and adjusting ring to prevent contaminants or rust from interfering with thread operation. The seal also prevents lubrication from escaping or evaporating between the threaded members.

9 Claims, 1 Drawing Sheet

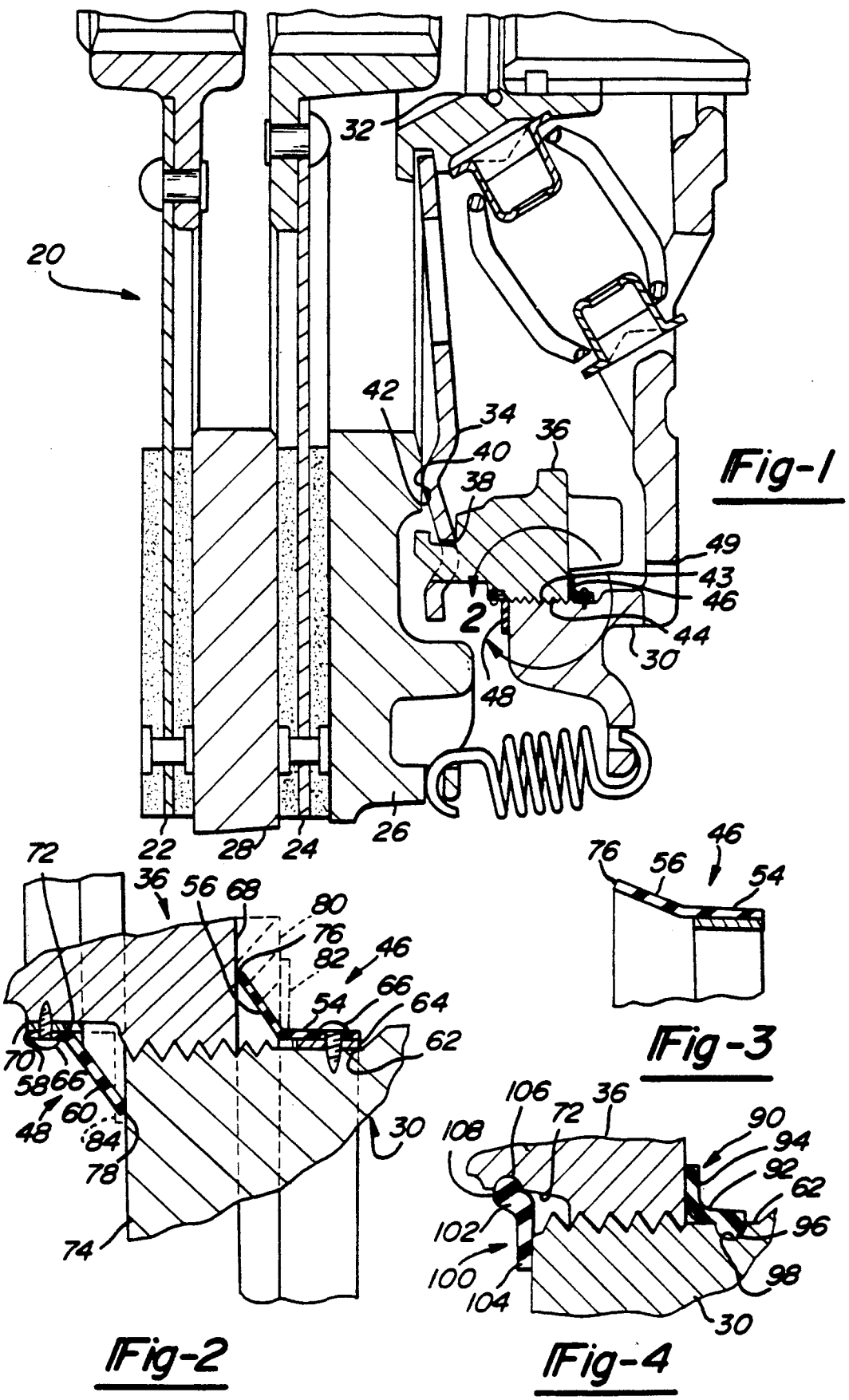

ADJUSTING RING SEAL

BACKGROUND OF THE INVENTION

This invention relates to a sealing structure for an adjusting ring in a clutch.

Clutches are known in the prior art wherein levers selectively force drive and driven discs into contact in order to transmit drive from a flywheel to a driven shaft. A flywheel ring or clutch cover rotates with the flywheel, and an adjusting ring attached to the clutch cover provides an abutment face to properly position the levers relative to the other members of the clutch. The primary purpose of the adjusting ring is to compensate for wear on the drive and driven discs by varying the position of the levers.

Typically, the adjusting ring is cylindrical, and has a threaded outer peripheral surface with respect to a center axis of the ring, which mates with a corresponding cylindrical threaded inner peripheral surface of the clutch cover. When the adjusting ring is rotated relative to the cover, it moves in an axial direction and the levers are repositioned accordingly.

In the prior art, the mating threads on the adjusting ring and clutch cover, hereinafter the adjustment threads, are exposed to contaminants and rust forming moisture. The contaminants include particulate matter generated from within the clutch as the discs wear. As a result of the contaminants and rust, the threaded surfaces between the adjusting ring and the flywheel housing may sometimes bind.

To reduce the friction opposing the relative rotation of the adjusting ring and clutch cover, the mating adjustment threads have typically been lubricated with a material such as grease. While lubrication initially improves operation, lubricants have tended to evaporate over time. Further, if too much lubricant is used, it may escape from the threaded area, which is undesirable.

SUMMARY OF THE INVENTION

In a disclosed embodiment of the present invention, seals are provided adjacent to the adjustment threads. The seals prevent the entry of contaminants and rust forming moisture, while retaining lubricants between the adjustment threads.

A first seal is secured to an inner peripheral surface of the clutch cover adjacent to the cover adjustment thread and includes a lip which is biased against a side surface of the adjusting ring. A second seal is secured to an outer peripheral surface of the adjusting ring adjacent to the adjusting ring adjustment thread and includes a lip which is biased against a side surface of the cover.

These and other features of the present invention can best be understood from the following specification and drawings, of which the following is a brief description.

BRIEF DESCRIPTION OF THE DRAWINGS

FIG. 1 is a cross-sectional view through a portion of a clutch embodying the present invention.

FIG. 2 is a cross-sectional fragmentary view on an enlarged scale of the encircled area shown in FIG. 1.

FIG. 3 is a fragmentary view showing a preferred shape of a seal in its relaxed state according to the present invention.

FIG. 4 illustrates an alternative embodiment of the seal structure according to the present invention.

DETAILED DESCRIPTION OF A PREFERRED EMBODIMENT

A clutch 20 shown in FIG. 1 has a pair of spaced driven discs 22 and 24 which are selectively engaged with a pressure plate 26 and an intermediate plate 28 to transmit drive between a clutch cover or housing 30, which rotates with a flywheel and a driven shaft. When clutch 20 is engaged, the above-described members 22, 24, 26, 28 and 30 all rotate. A spring retainer 32 is selectively moved to change the position of a plurality of levers 34, which in turn selectively force pressure plate 26 into disc 24 to engage clutch 20.

An adjusting ring 36 is threadingly attached to clutch cover 30 and provides an abutment surface 38 to properly position levers 34 relative to the other members of clutch 20. Each lever 34 has a surface 40 which abuts a surface 42 of pressure plate 26. As is known, when spring retainer 32 is selectively moved to the left, as shown in this figure, levers 34 are biased against pressure plate 26, moving it to the left and engaging clutch 20.

The amount of force delivered from levers 34 to pressure plate 26 is dependent in part upon the axial position of adjusting ring 36 and abutment surface 38. Adjusting ring 36 has a threaded outer peripheral surface 43 which cooperates with a corresponding threaded inner peripheral surface 44 of clutch cover 30. Adjusting ring 36 may be rotated relative to cover 30 such that abutment surface 38 moves in an axial direction and the levers 34 are repositioned. As pressure plate 26, intermediate plate 28, and discs 22 and 24 wear, adjusting ring 36 is adjusted to compensate for wear. Clutch 20 includes a pair of peripheral seals 46 and 48. Seals 46 and 48 prevent the entry of contaminants and rust forming moisture while retaining lubricants between the mating adjusting thread surfaces 43 and 44. A plurality of holes 49 are disposed in clutch cover 30 to prevent build-up of undesirable residue within clutch 20.

As illustrated in FIG. 2, seal 46 includes a base 54 and a lip 56 extending from an edge of base 54. Seal 48 includes a similar base 58, and a lip 60. Seals 46 and 48 are preferably made from rubber with an approximate thickness of 0.03 inches (0.76 mm), and may be made from Buna "N" rubber. Base 54 of seal 46 is secured to an inner peripheral surface 62 of clutch cover 30 using a metal band 64. Metal band 64 may be formed of steel, with base 54 bonded to it. A plurality of mechanical fasteners 66 may pass through base 54 and band 64 to secure seal 46 to the inner peripheral surface 62 of clutch cover 30. As shown, lip 56 extends radially inwardly from base 54, and abuts a side surface 68 of adjusting ring 36. Similarly, seal 48 includes a metal band 70, which may be molded to base 58. Mechanical fasteners 66 pass through base 58 and band 70 to engage inner peripheral surface 72 of adjusting ring 36. Lip 60 extends radially outwardly from base 58 and is biased against a side surface 74 of clutch cover 30. Metal bands 64 and 70 provide added support to the connection of flexible bases 54 and 58, and further ensure that the free ends 76 and 78 of lips 56 and 60, respectively, are firmly compressed against their mating surfaces.

As shown in FIG. 2, adjusting ring 36 is at an intermediate adjusted position towards the left. When adjusting ring 36 is initially mounted to clutch cover 30, it may have a side surface 68 at the position shown in phantom at 80. At that location, seal 46 has lip 56 which extends generally perpendicularly from base 54 at a position shown in phantom at 82. Similarly, lip 60 extends generally perpendicular from base 58 to the position shown in phantom at 84. As should be understood, as adjusting ring 36 is adjusted to the left, lips 56 and 60 move more towards the position shown in FIG. 2, where they extend at an angle relative to their respective bases 54 and 58. Thus, as adjusting ring 36 is adjusted to the left relative to clutch cover 30, seals 46 and 48 adjust their relative positions to ensure an adequate continuous seal.

While a metallic band is illustrated, the use of adhesive is also permissible. The adhesive, however, must be designed to provide proper seating of the base.

FIG. 3 illustrates seal 46. Preferably, lip 56 extends at an angle of approximately 150 degrees with respect to base 54 in a relaxed state. As described above, when installed, free end 76 of lip 56 is biased against a mating surface even when an adjusting ring is at an extreme axial position relative to the clutch cover. Seal 48 has a similar structure, including the lip 60 being at approximately an angle of 150 degrees relative to base 58.

FIG. 4 illustrates an alternative seal embodiment of the present invention. Adjusting ring 36 is shown positioned at a rightward most location such that it may only move axially to the left with respect to clutch cover 30. Seal 90 includes a base 92, a lip 94 and a bead 96 sized to snap into a corresponding groove 98 formed in inner peripheral surface 62 of cover 30. Seal 100 includes a base 102, a lip 104 and a bead 106 sized to snap into a corresponding groove 108 formed in outer peripheral surface 72 of adjusting ring 36.

Preferred embodiments of the present invention have been disclosed. A worker of ordinary skill in the art, however, would recognize that certain modifications would come within the scope of this invention. For that reason the following claims should be studied in order to determine the true scope and content of this invention.

I claim:

1. A clutch comprising:
    a first disc adapted to be fixed for rotation with a shaft;
    a housing adapted to be fixed to a source of rotational drive, and a plate fixed for rotation with said housing;
    bias means to selectively cause said plate to contact said first disc and transmit rotation from said housing to said shaft;
    an adjusting ring providing an abutment surface for said bias means, said adjusting ring having an adjusting thread at a peripheral surface, and said housing having a housing thread at a peripheral surface, said adjusting thread mating with said housing thread such that said adjusting ring is threadably adjustable on said housing to adjust the location of said abutment surface relative to said housing; and
    at least one seal positioned adjacent to said adjusting thread and said housing thread, and having a base secured to a surface of one of said adjusting ring and said housing, with a flexible lip integrally connected to an edge of said base and extending to a free end, said free end of said lip being biased against the other one of said adjusting ring and said housing.

2. A clutch as recited in claim 1, wherein there are a pair of said seals, with a first seal being secured to said adjusting ring and the second seal being secured to said housing.

3. A clutch as recited in claim 2, with said free end of said first seal being biased against said housing, and said free end of said second seal being biased against said adjusting ring.

4. A clutch as recited in claim 3, with said free end of said first seal being biased against said housing at a first end of said adjusting thread and said housing thread, and said free end of said second seal being biased against said adjusting ring at a second end of said adjusting thread and said housing thread.

5. A clutch as recited in claim 1, with said base having a bead received in a groove formed in said one of said adjusting ring and said housing.

6. A clutch as recited in claim 1, with said base being secured to a metallic band, and a plurality of mechanical fasteners passing through said base and said band to engage said one of said adjusting ring and said housing.

7. A clutch as recited in claim 1, wherein said lip extends laterally outwardly at an angle with respect to said base when said lip is in a relaxed position.

8. A clutch as recited in claim 7, wherein said angle is approximately 150 degrees.

9. A clutch comprising:
    a first disc adapted to be fixed for rotation with a shaft;
    a housing adapted to be fixed to a source of rotational drive, and a plate fixed for rotation with said housing;
    bias means to selectively cause said plate to contact said first disc and transmit rotation from said housing to said shaft;
    an adjusting ring providing an abutment surface for said bias means, said adjusting ring having an adjusting thread at a first outer peripheral surface, and said housing having a housing thread at a first inner peripheral surface, said adjusting thread mating with said housing thread such that said adjusting ring is threadably adjustable on said housing to adjust the location of said abutment surface relative to said housing; and
    a pair of seals, a first seal having a base secured to said outer peripheral surface of said adjusting ring and having a lip integrally connected to said base and extending to a free end, said free end of said first seal being biased against said housing at a first end of said adjusting thread and said housing thread, a second seal having a base secured to said inner peripheral surface of said housing and having a lip integrally connected to said base and extending to a free end, said free end of said second seal being biased against said adjusting ring at a second end of said adjusting thread and said housing thread.

* * * * *